(12) United States Patent
Yamada

(10) Patent No.: US 10,875,478 B2
(45) Date of Patent: Dec. 29, 2020

(54) WIRE HARNESS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Kensuke Yamada, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/765,999

(22) PCT Filed: Nov. 20, 2018

(86) PCT No.: PCT/JP2018/042759
§ 371 (c)(1),
(2) Date: May 21, 2020

(87) PCT Pub. No.: WO2019/102981
PCT Pub. Date: May 31, 2019

(65) Prior Publication Data
US 2020/0276942 A1  Sep. 3, 2020

(30) Foreign Application Priority Data
Nov. 23, 2017 (JP) .................................. 2017-225289

(51) Int. Cl.
*B60R 16/02* (2006.01)
*H01B 7/18* (2006.01)
(Continued)

(52) U.S. Cl.
CPC ......... *B60R 16/0215* (2013.01); *H01B 1/023* (2013.01); *H01B 7/0045* (2013.01); *H01B 7/18* (2013.01)

(58) Field of Classification Search
CPC ...... B60R 16/0215; H01B 1/023; H01B 7/18; H01B 7/0045
(Continued)

(56) References Cited

U.S. PATENT DOCUMENTS 9,455,068 B2    9/2016  Omoto
2011/0155458 A1*  6/2011  Kato .................. B60R 16/0215
                                                                174/74 R
(Continued)

FOREIGN PATENT DOCUMENTS

EP      2789720 A1    10/2014
JP    2017-172062 A    9/2017
JP    2017-174548 A    9/2017

OTHER PUBLICATIONS

International Search Report dated Dec. 18, 2018 for WO 2019/102981 A1 (4 pages).

*Primary Examiner* — Sherman Ng
(74) *Attorney, Agent, or Firm* — Abelman, Frayne & Schwab

(57) ABSTRACT

Provided is a braided wire (1) capable of suppressing disconnection of strands (2) caused by vibration, and a wire harness (3) in which the braided wire (1) is used. The braided wire (1) includes a plurality of the strands (2) that are braided. The braided wire (1) has a tubular shape. The strands (2) are each constituted by an aluminum wire or an aluminum alloy wire. The strand has a strand diameter of 0.25 mm or more and less than 0.34 mm. The wire harness (3) includes the braided wire (1).

5 Claims, 2 Drawing Sheets

(51) Int. Cl.
*H01B 1/02* (2006.01)
*H01B 7/00* (2006.01)

(58) Field of Classification Search
USPC ........................................................ 174/72 A
See application file for complete search history.

(56) References Cited

U.S. PATENT DOCUMENTS

| | | | |
|---|---|---|---|
| 2015/0155638 A1* | 6/2015 | Nagahashi | H01R 4/203 174/74 R |
| 2015/0289423 A1* | 10/2015 | Imahori | B60L 50/50 307/10.1 |
| 2016/0155533 A1 | 6/2016 | Omoto | |
| 2016/0329651 A1 | 11/2016 | Yamaguchi et al. | |

\* cited by examiner

WIRE HARNESS

CROSS REFERENCE TO RELATED APPLICATIONS

This application is a national phase of PCT application No. PCT/JP2018/042759, filed on 20 Nov. 2018, which claims priority from Japanese patent application No. 2017-225289, filed on 23 Nov. 2017, all of which are incorporated herein by reference.

TECHNICAL FIELD

The present invention relates to a braided wire and a wire harness.

BACKGROUND

Conventionally, braided wires obtained by braiding a plurality of strands into a tubular shape are used in wire harnesses used in vehicles such as automobiles. As disclosed in Patent Document 1, copper-based strands such as bare soft copper wires, oxygen-free soft copper wires, and tin-plated soft copper wires have been used as strands constituting this type of braided wire, for example.

In recent years, in order to reduce the weight of wire harnesses and the like, studies have been conducted regarding the use of aluminum-based strands made of aluminum or an aluminum alloy, instead of copper-based strands.

PRIOR ART DOCUMENT

Patent Document

Patent Document 1: JP 2015-018756A

SUMMARY OF THE INVENTION

Problems to be Solved

However, braided wires constituted by aluminum-based strands are problematic in that strands are likely to be disconnected when subjected to repetitive vibration under strain.

The present invention was made in light of the above-described circumstances, and aims to provide a braided wire capable of suppressing disconnection of strands caused by vibration, and a wire harness in which the braided wire is used.

Means to Solve the Problem

An aspect of the present invention is a tubular braided wire that includes a plurality of strands that are braided, in which the strands are each constituted by an aluminum wire or an aluminum alloy wire, and the strand has a strand diameter of 0.25 mm or more and less than 0.34 mm.

Another aspect of the present invention is a wire harness that includes the braided wire.

Effect of the Invention

In the braided wire, strands that constitute the braided wire are each constituted by aluminum wires or aluminum alloy wires, and a strand diameter of the strand is set to the above-described range. Thus, with the braided wire, even if vibration is applied to the braided wire, strain applied to each strand is low. Therefore, the braided wire can suppress disconnection of strands even if the braided wire is vibrated in a bent and strained state.

The wire harness includes the braided wire. Thus, with the wire harness, even if vibration is applied to the wire harness, disconnection of strands of the braided wire is suppressed. Therefore, according to the wire harness, shielding reliability obtained by the braided wire can be improved.

DETAILED DESCRIPTION TO EXECUTE THE INVENTION

Figure 1:
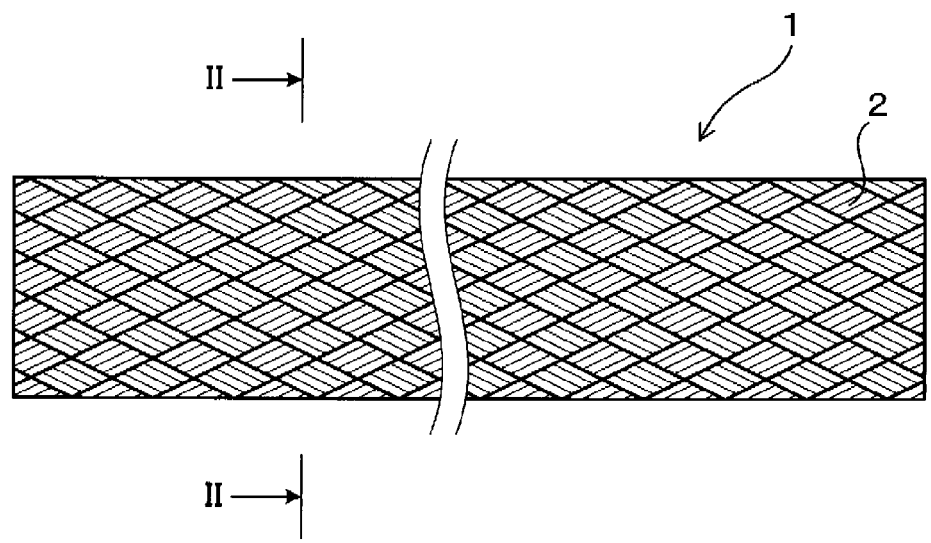
FIG. 1 is a schematic external view of a braided wire of Example 1.

The braided wire is obtained by braiding a plurality of strands into a tubular shape. The strands are each constituted by an aluminum wire or an aluminum alloy wire.

Examples of the aluminum alloy include 1000 series Al alloys, 3000 series Al alloys, 5000 series Al alloys, 6000 series Al alloys, and 7000 series Al alloys. Also, in addition, an example of the aluminum alloy is an aluminum alloy having a chemical composition containing Mg in an amount of 0.1 mass % to 1.5 mass % inclusive, Si in an amount of 0.03 mass % to 2.0 mass % inclusive, and Cu in an amount of 0.05 mass % to 0.5 mass % inclusive, the remaining portion including Al and inevitable impurities, and a mass ratio between Mg and Si (Mg/Si) being 0.8 to 3.5 inclusive. An aluminum alloy having the chemical composition may have a tensile strength of 200 MPa or more, and have an electrical conductivity of 50% IACS or more. If an aluminum alloy having the chemical composition is used as the aluminum alloy for constituting an aluminum alloy wire, the strength and conductivity of strands are increased, and thus it is possible to obtain a braided wire by which disconnection of strands caused by vibration can be suppressed while ensuring good shield performance. Note that the chemical composition may further contain at least one element of Fe in an amount of 0.1 mass % to 1.0 mass % inclusive and Cr in an amount of 0.01 mass % to 0.5 mass % inclusive. Also, the chemical composition may further contain at least one element of Ti (500 ppm or less) and B (50 ppm or less) in a mass fraction.

In the braided wire, all of a plurality of strands that constitute the braided wire are preferably constituted by aluminum wires or aluminum alloy wires made of the same material. According to this configuration, in the entire braided wire, variation is unlikely to occur in bending properties of strands, and the bending properties can be easily made uniform. Thus, according to this configuration, even if the braided wire is subjected to repetitive vibration in a bent and strained state, portions where local disconnection is likely to occur are unlikely to appear, and disconnection of strands caused by vibration can easily be suppressed.

In the braided wire, the aluminum wires or the aluminum alloy wires may be configured such that surfaces thereof do not have a surface treatment layer. That is, in the braided wire, the aluminum wires or the aluminum alloy wires may be configured such that aluminum or an aluminum alloy is exposed at the surfaces thereof. Note that an oxide film that is naturally formed on the surface of aluminum or the aluminum alloy is not included in the surface treatment layer. Also, the above-described exposure of the aluminum or the aluminum alloy includes the presence of an oxide film that is naturally formed on the surface of the aluminum or the aluminum alloy. According to the above-described configuration, surface treatment need not be performed in advance on the surface of aluminum or an aluminum alloy in order to prevent abrasion caused by strands rubbing against each other due to vibration. Thus, the weight of a braided wire can be reduced, and the cost of a braided wire can be reduced by a corresponding amount.

Here, in the braided wire, the strand has a strand diameter (diameter) of 0.25 mm or more and less than 0.34 mm. If the strand diameter is less than 0.25 mm, it takes time to manufacture the braided wire because the strand diameter thereof is excessively small and the wire drawing length thereof extends, and thus the mass productivity of strands and braided wires decreases. As a result, it is likely that the strand manufacturing cost will also increase. On the other hand, if the strand diameter is 0.34 mm or more, it is difficult to set the disconnection rate to 30% or less. Also, an increase in the strand diameter is disadvantageous in reducing the weight of a braided wire.

From the viewpoint of improving the mass productivity of strands and braided wires, the strand diameter may be preferably 0.255 mm or more, more preferably 0.26 mm or more, even more preferably exceed 0.26 mm, still more preferably 0.265 mm or more, and yet more preferably 0.27 mm or more. On the other hand, from the viewpoint of reducing the disconnection rate of a strand, for example, the strand diameter may be preferably 0.335 mm or less, more preferably 0.33 mm or less, even more preferably 0.325 mm or less, still more preferably 0.32 mm or less, still more preferably 0.315 mm or less, still more preferably 0.31 mm or less, still more preferably 0.305 mm or less, still more preferably less than 0.30 mm, still more preferably 0.295 mm or less, and still more preferably 0.29 mm or less. Note that the upper and lower limits of the above-described strand diameter can be combined as necessary.

With the braided wire, from the viewpoint of improving applicability to a vibration portion of a vehicle, for example, the disconnection rate of a strand may be preferably 30% or less, more preferably 25% or less, and even more preferably 20% or less. Note that a method for measuring the disconnection rate of a strand in a braided wire will be described later in experimental examples.

The wire harness includes the braided wire. Specifically, the wire harness may have a configuration in which at least a harness end portion is covered by the braided wire. An electrical wire of the wire harness is often exposed at a harness end portion. According to the above-described configuration, even if an electrical wire is exposed at a harness end portion, the exposed portion can be covered by the braided wire, and strands of the braided wire are unlikely to be disconnected due to strands rubbing against each other due to vibration. Thus, according to the above-described configuration, a wire harness having high shielding reliability due to the braided wire can be obtained.

The wire harness may be configured to be connected to a vibration portion in the outside of the interior space of a vehicle. Examples of the vehicle include automobiles, electric railcars, trains, and motorcycles. According to this configuration, even if the braided wire repeatedly vibrates due to vibration of the vibration portion, strands of the braided wire are unlikely to be disconnected, and thus a wire harness for a vehicle having high shielding reliability due to the braided wire can be obtained.

A specific example of a configuration of the wire harness is a configuration in which the wire harness has an electrical wire, a protective member covering the outer circumferential surface of the electrical wire, a connector connected to the electrical wire exposed from the protective member at a harness end portion, and the braided wire that is fixed to an end portion of the protective member and an end portion of the connector, and covers the outer circumferential surface of the electrical wire exposed from the protective member. Note that examples of the protective member may include metal pipes. According to this configuration, if the connector of the wire harness is connected to a vibration portion, even if the braided wire repeatedly vibrates due to vibration of the vibration portion, strands of the braided wire are unlikely to be disconnected, and thus a wire harness having high shielding reliability due to the braided wire can be obtained. Note that examples of the vibration portion include an engine of a vehicle such as an automobile, a door opening and closing portion (a bending portion), a motor, and a battery.

Note that the above-described configurations may be combined as needed in order to obtain the above-described effects and the like.

EXAMPLES

Hereinafter, braided wires and wire harnesses of examples will be described with reference to the drawings.

Example 1

Figure 2:
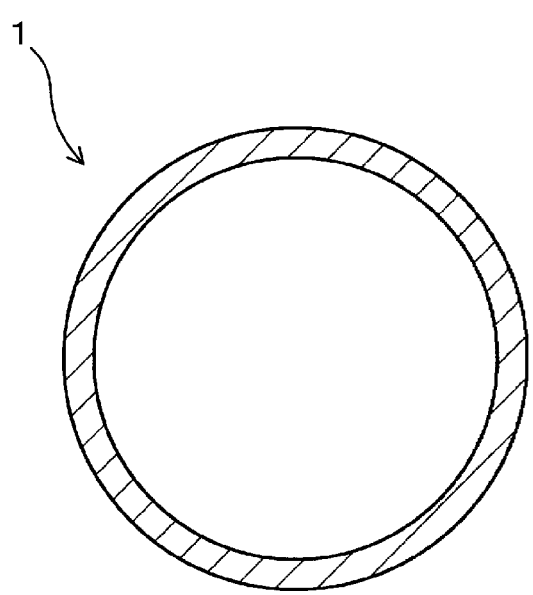
FIG. 2 is a diagram schematically showing a cross-section taken along line II-II in FIG. 1.

A braided wire of Example 1 will be described with reference to FIGS. 1 and 2. As shown in FIGS. 1 and 2, a braided wire 1 of this example has a plurality of strands 2 that are braided. The braided wire 1 has a tubular shape. Note that the strands 2 are not shown in FIG. 2.

The strands 2 are each constituted by an aluminum wire or an aluminum alloy wire. Surface treatment is not performed on the surface of the aluminum wire or the aluminum alloy wire, and aluminum or an aluminum alloy is exposed. The strand diameter of the strand is set to 0.25 mm or more and less than 0.34 mm. Note that a cross-section perpendicular to a strand axis of the strand is circular in this example.

Figure 3:
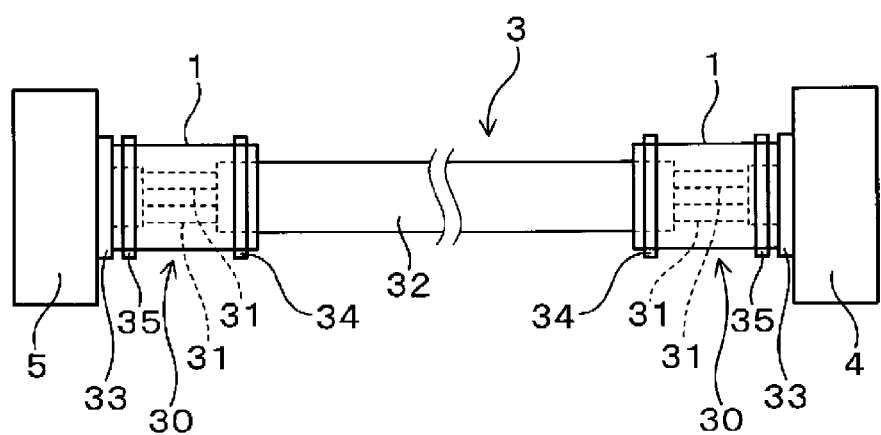
FIG. 3 is a diagram schematically showing a wire harness of Example 1 and an application example of the wire harness.

Next, a wire harness of Example 1 will be described with reference to FIG. 3. As shown in FIG. 3, a wire harness 3 of this example includes the braided wire 1 of this example.

In this example, specifically, the wire harness 3 includes electrical wires 31, a protective member 32 covering the outer circumferential surface of the electrical wires 31, connectors 33 connected to the electrical wires 31 exposed from the protective member 32 at harness end portions 30, and braided wires 1 that are respectively fixed to end portions of the protective member 32 and end portions of the connectors 33, and that cover the outer circumferential surfaces of the electrical wires 31 exposed from the protective member 32. An example in which both harness end portions 30 are covered by the braided wires 1 is shown in FIG. 3. Also, specifically, the protective member 32 is a metal pipe.

In this example, the connector 33 located on one harness end portion 30 side is connected to an engine of an automobile, which is a first vibration portion 4. Also, the connector 33 located on the other harness end portion 30 side is connected to a battery of the automobile, which is a second vibration portion 5. Note that the wire harness 3 of this example is a wire harness for underfloor use installed outside the interior space of an automobile. Also, the braided wire 1 is fixed to an end portion of the protective member 32 by crimping a ring member 34. Also, the braided wire 1 is fixed to an end portion of the connector 33 through fastening using a band member 35.

Hereinafter, samples of braided wires were produced and evaluated. Experimental examples therefor will be described.

Experimental Examples

Production of Braided Wire

Three types of aluminum alloy wires were prepared which were made of an aluminum alloy having a chemical composition containing Mg in an amount of 0.1 mass % to 1.5 mass % inclusive, Si in an amount of 0.03 mass % to 2.0 mass % inclusive, and Cu in an amount of 0.05 mass % to 0.5 mass % inclusive, the remaining portion including Al and inevitable impurities, and a mass ratio between Mg and Si (Mg/Si) being 0.8 to 3.5 inclusive. The strand diameter of the Al alloy wire was set to 0.26 mm, 0.304 mm, or 0.34 mm. Note that no surface treatment such as plating or chemical conversion treatment was performed on the surfaces of the prepared Al alloy wires.

A braided wire of Sample 1 was obtained by braiding a plurality of the Al alloy wires having a strand diameter of 0.26 mm into a tubular shape. A braided wire of Sample 2 was obtained by braiding a plurality of the Al alloy wires having a strand diameter of 0.304 mm into a tubular shape. A braided wire of Sample 3 was obtained by braiding a plurality of the Al alloy wires having a strand diameter of 0.34 mm into a tubular shape. Note that the number of strands was set to 44 and the number of ends was set to 4 for a braiding configuration of each of the produced braided wires.

Vibration Test

A disconnection rate was checked by vibrating a braided wire one million times under a constant strain (specifically, curvature change amount ΔK=0.0056 strain). Note that the disconnection rate was obtained using a calculation expression 100×(the number of disconnected strands)/(the total number of strands). A sample having a disconnection rate of 10% or less was evaluated as "A" because the sample had a good effect of suppressing disconnection of strands caused by vibration. A sample having a disconnection rate of more than 10% and 30% or less was evaluated as "B" because disconnection of strands caused by vibration was suppressed. A sample having a disconnection rate of more than 30% was evaluated as "C" because disconnection of strands caused by vibration was not suppressed.

As a result of the above-described vibration test, the disconnection rate of the braided wire of Sample 1 was 4%, which was evaluated as "A", the disconnection rate of the braided wire of Sample 2 was 18%, which was evaluated as "B", and the disconnection rate of the braided wire of Sample 3 was 32.5%, which was evaluated as "C".

From the above-described results, it was confirmed that, in a braided wire having a plurality of strands constituted by Al wires or Al alloy wires, even if the braided wire is subjected to repetitive vibration under strain, disconnection of the strands can be easily suppressed by setting the strand diameter of a strand to 0.25 or more and less than 0.34 mm, without performing surface treatment on the strand surfaces.

Although examples of the present invention have been described in detail above, the present invention is not limited to the above-described examples and experimental examples, and various modifications can be made without departing from the gist of the present invention.

What is claimed is:

1. A wire harness comprising: an electrical wire; a protective member covering an outer circumferential surface of the electrical wire; a connector connected to the electrical wire exposed from the protective member at a harness end portion; and a tubular braided wire that is fixed to an end portion of the protective member and an end portion of the connector, and that covers the outer circumferential surface of the electrical wire exposed from the protective member, wherein the braided wire includes a plurality of strands that are braided, wherein the strands are each constituted by an aluminum alloy wire having a chemical composition containing Al, and Mg in an amount of 0.1 mass % to 1.5 mass % inclusive, and Si in an amount of 0.03 mass % to 2.0 mass % inclusive, with a mass ratio between Mg and Si (Mg/Si) being 0.8 to 3.5 inclusive, and the strand has a strand diameter of 0.25 mm or more and less than 0.34 mm.

2. The wire harness according to claim 1, wherein the strand has a strand diameter of 0.26 mm to 0.335 mm inclusive.

3. The wire harness according to claim 1, wherein the strand has a strand diameter of 0.26 mm to 0.304 mm inclusive.

4. The wire harness according to claim 1, wherein a surface of the aluminum wire or the aluminum alloy wire does not have a surface treatment layer.

5. The wire harness according to claim 1, the wire harness being configured to be connected to a vibration portion in the outside of an interior space of a vehicle.

* * * * *